(12) United States Patent
Nakamura et al.

(10) Patent No.: US 11,398,021 B2
(45) Date of Patent: Jul. 26, 2022

(54) METHOD FOR INSPECTING PILLAR-SHAPED HONEYCOMB FORMED BODY BEFORE FIRING OR AFTER FIRING

(71) Applicant: NGK INSULATORS, LTD., Nagoya (JP)

(72) Inventors: Hirotada Nakamura, Gifu (JP); Junya Hasegawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 51 days.

(21) Appl. No.: 17/113,401

(22) Filed: Dec. 7, 2020

(65) Prior Publication Data
US 2021/0279849 A1   Sep. 9, 2021

(30) Foreign Application Priority Data
Mar. 9, 2020   (JP) .............................. JP2020-040295

(51) Int. Cl.
*G06T 7/00* (2017.01)
*G06T 7/62* (2017.01)
*G01N 21/95* (2006.01)
*G01N 21/88* (2006.01)

(52) U.S. Cl.
CPC ......... *G06T 7/001* (2013.01); *G01N 21/8851* (2013.01); *G01N 21/9515* (2013.01); *G06T 7/62* (2017.01)

(58) Field of Classification Search
CPC ......... G06T 2207/10081; G06T 7/0012; G06T 1/0007; G06T 2207/20056; G06T 2210/32; G06T 7/0002; G06T 7/42; G06T 7/68; G06T 7/70; G06T 7/90; G06T 2207/10088; G06T 2207/10116; G06T 2207/30024; G06T 5/20; G06T 7/0004; G06T 7/10; G06T 7/40; G06T 7/62; G06T 2207/30148; G06T 7/001; G06T 2200/24; G06T 2207/30108; G06T 2207/30168; G06T 7/0006; G06T 7/0008; G06T 7/74
See application file for complete search history.

(56) References Cited

U.S. PATENT DOCUMENTS

| | | | |
|---|---|---|---|
| 6,405,602 B1 | 6/2002 | Itou et al. | |
| 2002/0020944 A1* | 2/2002 | Yamaguchi | C04B 38/0006 425/290 |

(Continued)

FOREIGN PATENT DOCUMENTS

| | | |
|---|---|---|
| EP | 2 913 666 A2 | 9/2015 |
| JP | 2001-041867 A1 | 2/2001 |

(Continued)

*Primary Examiner* — Quan M Hua
(74) *Attorney, Agent, or Firm* — Burr & Brown, PLLC

(57) ABSTRACT

A method for inspecting a pillar-shaped honeycomb formed body before firing includes a step a1 of capturing at least one of a first end surface and a second end surface of a pillar-shaped honeycomb formed body before firing with a camera to generate an image of the at least one of the first end surface and the second end surface; a step b1 of measuring a size of an opening of a plurality of cells in the image generated by step a1; and a step c1 of identifying abnormal cells with the opening having a size deviating from a predetermined allowable range from the cells based on a measurement result of step b1, and measuring a number of the abnormal cells.

10 Claims, 6 Drawing Sheets

(56) References Cited

U.S. PATENT DOCUMENTS

| | | | |
|---|---|---|---|
| 2008/0226158 A1* | 9/2008 | Abe | G06T 7/0006 |
| | | | 382/149 |
| 2017/0056805 A1* | 3/2017 | Mori | B01D 46/2474 |
| 2017/0153169 A1 | 6/2017 | Iida et al. | |
| 2019/0026414 A1 | 1/2019 | Nickerson et al. | |

FOREIGN PATENT DOCUMENTS

| | | |
|---|---|---|
| JP | 2015-161543 A1 | 9/2015 |
| JP | 2017-096879 A1 | 6/2017 |
| JP | 2019-512079 A1 | 5/2019 |

* cited by examiner

METHOD FOR INSPECTING PILLAR-SHAPED HONEYCOMB FORMED BODY BEFORE FIRING OR AFTER FIRING

FIELD OF THE INVENTION

The present invention relates to a method for inspecting a pillar-shaped honeycomb formed body.

BACKGROUND OF THE INVENTION

Ceramic pillar-shaped honeycomb structures, which have excellent heat resistance and corrosion resistance, have been used as catalyst carriers or filters used for environmental measures, recovery of specific materials and the like, in various fields such as automobiles, chemistry, electric power, and steel. A pillar-shaped honeycomb structure comprises an outer peripheral side wall and partition walls which are arranged on the inner peripheral side of the outer peripheral side wall and partition a plurality of cells extending from one end surface to the other end surface. Generally, a pillar-shaped honeycomb structure is manufactured through the process of forming a green body by mixing and kneading a ceramic raw material powder, a dispersion medium, a binder, a pore-forming agent and the like, forming the green body into a predetermined shape to form a pillar-shaped honeycomb formed body, and firing it.

A pillar-shaped honeycomb structure requires sufficient mechanical strength to withstand impact and heat load. In particular, a pillar-shaped honeycomb structure used as a filter or a catalytic carrier in a vehicle must have sufficient mechanical strength to be placed in a metal housing during a process called "canning".

One of the indications for the mechanical strength of a pillar-shaped honeycomb structure is isostatic crush strength. In the measurement of the isostatic crush strength of a pillar-shaped honeycomb structure, a test is conducted in which the pillar-shaped honeycomb structure is submerged in water in a pressure vessel and isotropic pressure is applied to the pillar-shaped honeycomb structure by gradually increasing the water pressure. As the water pressure in the pressure vessel gradually increases, the partition walls and the outer peripheral side wall of the pillar-shaped honeycomb structure will be finally crushed. The value of the pressure at the time of crush (crush strength) is the isostatic crush strength.

However, when measuring the isostatic crush strength, it takes time because the work of setting the test product in the pressure vessel and applying pressure is required. In addition, the measurement of the isostatic crush strength causes damage to the pillar-shaped honeycomb structure. For this reason, it is impractical to directly measure the isostatic crush strength for quality inspection of the pillar-shaped honeycomb structures. Under these circumstances, methods for conveniently performing a strength inspection of the pillar-shaped honeycomb structure have been conventionally proposed.

For example, Japanese Patent Application Publication No. 2017-96879 (Patent Literature 1) and Japanese Patent Application Publication No. 2001-41867 (Patent Literature 2) have proposed a simple crush strength test method using an elastic body, which can shorten the measurement time.

Japanese Patent Publication No. 2019-512079 (Patent Literature 3) discloses a non-contact method for characterizing the isostatic crush strength of a ceramic article, comprising a step of recording a digital image of a web for a ceramic article having the web, a step of forming a 2D representation of the ceramic article based on the digital image, a step of simulating a selective amount of isostatic pressure given to the 2D representation to identify a maximum stress value in the 2D representation of the web, and identifying the isostatic crush strength of the ceramic article using the maximum stress value.

Further, although not intended to inspect the strength of a pillar-shaped honeycomb structure, Japanese Patent Application Publication No. 2015-161543 (Patent Literature 4) proposes to measure the size of the inscribed circle inscribed in the partition walls using an image analyzer only for a predetermined number of cells, for the purpose of rapidly inspecting cell deformation defect in ceramic honeycomb structures.

CITATION LIST

Patent Literature

[Patent Literature 1] Japanese Patent Publication No. 2017-96879

[Patent Literature 2] Japanese Patent Publication No. 2001-41867

[Patent Literature 3] Japanese Patent Publication No. 2019-512079

[Patent Literature 4] Japanese Patent Publication No. 2015-161543

SUMMARY OF THE INVENTION

Although the test methods described in Patent Literature 1 and Patent Literature 2 do not lead to crush, the amount of work required for the inspection is still large because the strength is inspected by actually applying pressure to the pillar-shaped honeycomb structure. In many cases, the inspection time tends to be long. In addition, there is a risk of damaging the product. Patent Literature 3 discloses a method for predicting isostatic crush strength in a non-contact manner, but a complicated simulation is required, and the prediction accuracy is unknown.

In Patent Literature 4, the proportion of cells having cell deformation defect among the measured cells is calculated by inspecting a part of the cells of the pillar-shaped honeycomb structure for the presence or absence of deformation defect using an image analyzer. However, it is unclear how the deformation defect of the part of cells is related to the strength of the pillar-shaped honeycomb structure, and it is not suggested that the strength of the pillar-shaped honeycomb structure can be estimated based on the deformation defect of a part of the cells.

The present invention has been made in view of the above circumstances, and in one embodiment, an object is to provide a method for inspecting a pillar-shaped honeycomb formed body before firing or after firing, which can be carried out non-destructively and can substitute for strength inspection.

The present inventors have made intensive study to solve the above problems, and found that the number of cells having an opening of abnormal size among a plurality of cells of a pillar-shaped ceramic formed body before firing or after firing shows a significant correlation with the strength of the pillar-shaped honeycomb formed body after firing. The present invention has been created based on this finding and is exemplified as below.

[1]

A method for inspecting a pillar-shaped honeycomb formed body before firing, the pillar-shaped honeycomb formed body having a pillar-shaped honeycomb structure portion comprising an outer peripheral side wall and partition walls disposed on an inner peripheral side of the outer peripheral side wall, the partition walls partitioning a plurality of cells forming flow paths from a first end surface to a second end surface, the method comprising:

a step a1 of capturing at least one of the first end surface and the second end surface of the pillar-shaped honeycomb formed body before firing with a camera to generate an image of the at least one of the first end surface and the second end surface;

a step b1 of measuring a size of an opening of the cells in the image generated by step a1; and a step c1 of identifying abnormal cells with the opening having a size deviating from a predetermined allowable range from the p cells based on a measurement result of step b1 and measuring a number of the abnormal cells.

[2]

The method according to [1], wherein the size of the opening of each of the cells is based on a diameter of a maximum circle that can fit within the opening of each of the cells.

[3]

The method according to [1] or [2], further comprising a step d1 of estimating a strength of the pillar-shaped honeycomb formed body after the pillar-shaped honeycomb formed body before firing is fired under predetermined conditions based on the number of the abnormal cells measured in step c1, using a correlation between a number of abnormal cells and strength of a plurality of other pillar-shaped honeycomb formed bodies after firing under the predetermined conditions, the correlation being obtained in advance for the plurality of other pillar-shaped honeycomb formed bodies having the same dimensions and the same composition as the pillar-shaped honeycomb formed body before firing.

[4]

The method according to [3], wherein a correlation having a coefficient of determination ($R^2$) of 0.6 or more is used as the correlation when a linear regression equation is calculated.

[5]

The method according to [3] or [4], wherein the strength is an isostatic crush strength.

[6]

A method for inspecting a pillar-shaped honeycomb formed body after firing, the pillar-shaped honeycomb formed body having a pillar-shaped honeycomb structure portion comprising an outer peripheral side wall and partition walls disposed on an inner peripheral side of the outer peripheral side wall, the partition walls partitioning a plurality of cells forming flow paths from a first end surface to a second end surface, the method comprising:

a step a2 of capturing at least one of the first end surface and the second end surface of the pillar-shaped honeycomb formed body after firing with a camera to generate an image of the at least one of the first end surface and the second end surface;

a step b2 of measuring a size of an opening of the cells in the image generated by step a2; and a step c2 of identifying abnormal cells with the opening having a size deviating from a predetermined allowable range from the cells based on a measurement result of step b2 and measuring a number of the abnormal cells.

[7]

The method according to [6], wherein the size of the opening of each of the cells is based on a diameter of a maximum circle that can fit within the opening of each of the cells.

[8]

The method according to [6] or [7], further comprising a step d2 of estimating a strength of the pillar-shaped honeycomb formed body after firing based on the number of the abnormal cells measured in step c2, using a correlation between a number of abnormal cells and strength of a plurality of other pillar-shaped honeycomb formed bodies, the correlation being obtained in advance for the other pillar-shaped honeycomb formed bodies having the same dimensions and the same composition, and having been prepared under the same firing conditions as the pillar-shaped honeycomb formed body after firing.

[9]

The method according to [8], wherein a correlation having a coefficient of determination ($R^2$) in a linear regression equation of 0.6 or more is used as the correlation.

[10]

The method according to [8] or [9], wherein the strength is an isostatic crush strength.

Since the method for inspecting a pillar-shaped honeycomb formed body before firing or after firing according to one embodiment of the present invention can be performed non-destructively without imposing a load on the pillar-shaped honeycomb formed body, there is very little risk of damaging the pillar-shaped honeycomb formed body. Further, since the method for inspection according to the present embodiment can substitute for strength inspection, it is not necessary to separately carry out a strength inspection. It is also possible to estimate the strength of the pillar-shaped honeycomb formed body after firing based on the results obtained by the method for inspection according to the present embodiment.

When an inspection according to one embodiment of the present invention is carried out on a pillar-shaped honeycomb formed body before firing or after firing, the formed body that has not passed the inspection can be reused as a forming raw material. In particular, by carrying out the inspection according to one embodiment of the present invention on the pillar-shaped honeycomb formed body before firing, it can substitute for a strength inspection after firing, so that there is a special advantage that the cost and time required for firing will not be wasted. Further, before firing, it is easy to reuse the formed body that has not passed the inspection as a forming raw material.

DETAILED DESCRIPTION OF THE INVENTION

Hereinafter, embodiments of the present invention will now be described in detail with reference to the drawings. It should be understood that the present invention is not intended to be limited to the following embodiments, and any change, improvement or the like of the design may be appropriately added based on ordinary knowledge of those skilled in the art without departing from the spirit of the present invention.

<1. Pillar-Shaped Honeycomb Formed Body>

In the method for inspecting a pillar-shaped honeycomb formed body according to the present invention, a pillar-shaped honeycomb formed body before firing or after firing can be the object for inspection. In general, the pillar-shaped honeycomb formed body has a pillar-shaped honeycomb structure portion comprising an outer peripheral side wall and partition walls disposed on an inner peripheral side of the outer peripheral side wall, the partition walls partitioning a plurality of cells forming flow paths from a first end surface to a second end surface.

Figure 1:
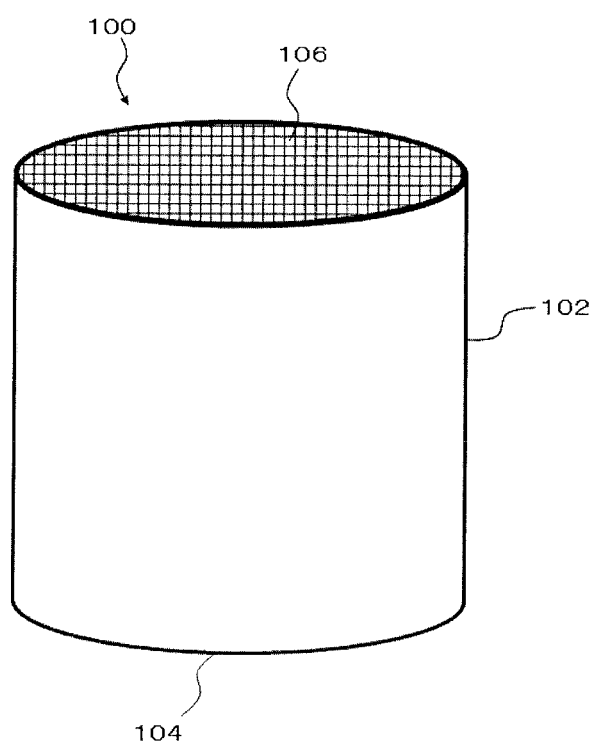
FIG. 1 is a perspective view schematically showing a wall-through type pillar-shaped ceramic formed body.
Figure 2:
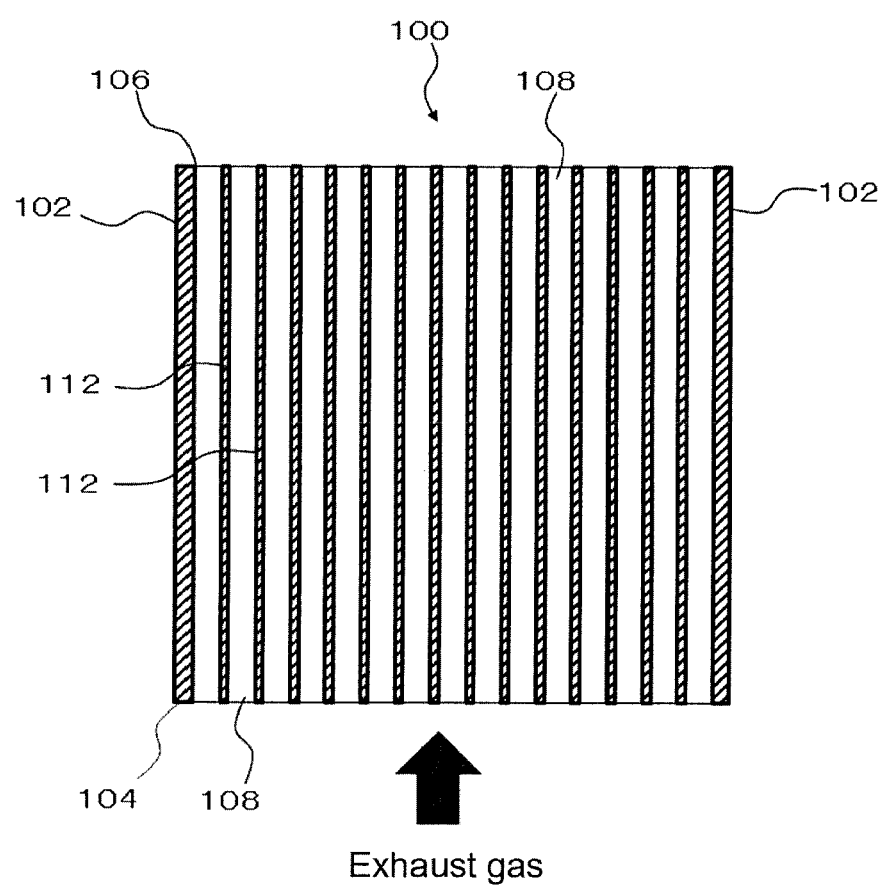
FIG. 2 is a schematic cross-sectional view of a wall-through type pillar-shaped ceramic formed body observed from a direction orthogonal to the direction in which the cells extend.

FIGS. 1 and 2 illustrate a schematic perspective view and a cross-sectional view of a pillar-shaped honeycomb formed body (100) applicable as a wall-through type automobile exhaust gas filter and/or catalyst carrier, respectively. The pillar-shaped honeycomb formed body (100) has a pillar-shaped honeycomb structure portion comprising an outer peripheral side wall (102) and partition walls (112) disposed on an inner peripheral side of the outer peripheral side wall (102), the partition walls (112) partitioning a plurality of cells (108) forming flow paths from a first end surface (104) to a second end surface (106). In this pillar-shaped honeycomb formed body (100), both ends of each cell (108) are open, and the exhaust gas flowing into one cell (108) from the first end surface (104) is purified while passing through the cell, and flows out from the second end surface (106).

Figure 3:
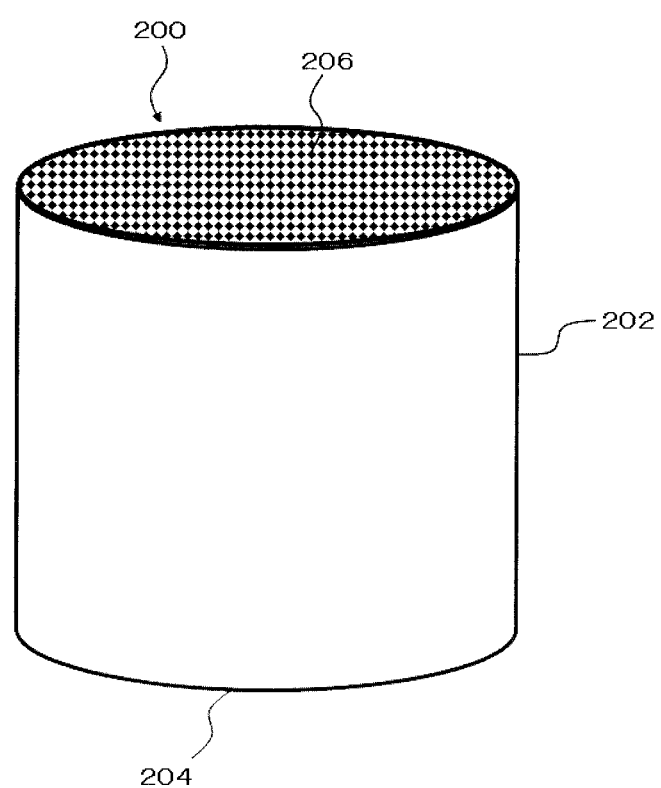
FIG. 3 is a schematic perspective view showing a wall-flow type pillar-shaped ceramic formed body.
Figure 4:
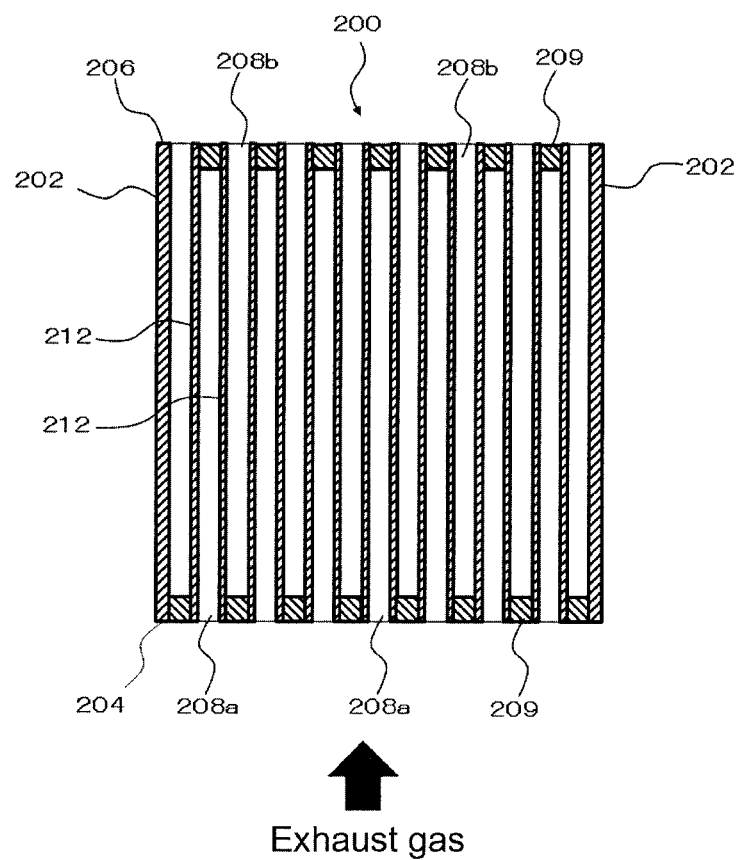
FIG. 4 is a schematic cross-sectional view of a wall-flow type pillar-shaped ceramic formed body observed from a direction orthogonal to the direction in which the cells extend.

FIGS. 3 and 4 illustrate a schematic perspective view and a cross-sectional view of a pillar-shaped honeycomb formed body (200) applicable as a wall-flow type automobile exhaust gas filter and/or catalyst carrier, respectively. The pillar-shaped honeycomb formed body (200) has a pillar-shaped honeycomb structure portion comprising an outer peripheral side wall (202) and partition walls (212) disposed on an inner peripheral side of the outer peripheral side wall (202), the partition walls (212) partitioning a plurality of cells (208a, 208b) forming flow paths from a first end surface (204) to a second end surface (206).

In the pillar-shaped honeycomb formed body (200), the cells (208a, 208b) can be classified into a plurality of first cells (208a) disposed on the inner peripheral side from the outer peripheral side wall (202), extending from the first end surface (204) to the second end surface (206), being open on the first end surface (204) and having a sealing portion (209) on the second end surface (206), and a plurality of second cells (208b) disposed on the inner peripheral side from the outer peripheral side wall (202), extending from the first end surface (204) to the second end surface (206), having a sealing portion (209) on the first end surface (204) and being open on the second end surface (206). Further, in this pillar-shaped honeycomb formed body (200), the first cells (208a) and the second cells (208b) are alternately arranged adjacent to each other with the partition walls (212) interposed therebetween.

When the exhaust gas containing soot is supplied to the first end surface (204) on the upstream side of the pillar-shaped honeycomb formed body (200) after firing, the exhaust gas is introduced into the first cells (208a) and proceeds downstream in the first cells (208a). Because the first cells (208a) have a sealing portion (209) on the second end surface (206) on the downstream side, the exhaust gas passes through the porous partition walls (212) that partition the first cells (208a) and the second cells (208b) and flows into the second cells (208b). Since soot cannot pass through the partition walls (212), it is collected and deposited in the first cells (208a). After the soot is removed, the cleaned exhaust gas that has flowed into the second cells (208b) proceeds downstream in the second cells (208b) and flows out of the second end surface (206) on the downstream side.

The shape of the end surfaces of the pillar-shaped honeycomb formed body (100, 200) is not limited, but for example, it can be a round shape such as a circular shape, an elliptical shape, a race track shape and an oval shape; a polygonal shape such as a triangular shape and a quadrangle shape, and other odd shapes. The pillar-shaped honeycomb formed body (100, 200) shown in the figures have a circular end surface and are cylindrical as a whole.

The shape of the cells in the cross-section perpendicular to the flow path direction of the cells is not limited, but is preferably a quadrangle, a hexagon, an octagon, or a combination thereof. Among these, quadrangle and hexagon are preferred. By making the cell shape in this way, the pressure loss when a fluid passes through the pillar-shaped honeycomb formed body is reduced, and the purification performance of catalyst becomes excellent.

The cell density (number of cells per unit cross-sectional area) is also not particularly limited, but for example, it can be 6 to 2000 cells/square inch (0.9 to 311 cells/cm$^2$), more preferably 50 to 1000 cells/square inch (7.8 to 155 cells/cm$^2$), particularly preferably 100 to 600 cells/square inch (15.5 to 92.0 cells/cm$^2$). Here, the cell density is calculated by dividing the number of cells comprised in the pillar-shaped honeycomb formed body (100, 200) by the area of one of the end surfaces of the pillar-shaped honeycomb formed body (100, 200) excluding the outer peripheral side wall.

In the pillar-shaped honeycomb formed body after firing, the partition walls can be made porous. The porosity of the partition walls may be appropriately adjusted according to the application, but from the viewpoint of suppressing the pressure loss of fluid, it is preferably 40% or more, more preferably 50% or more, and even more preferably 60% or more. Further, the porosity of the partition walls is preferably 80% or less, more preferably 75% or less, and even more preferably 70% or less, from the viewpoint of ensuring the strength of the honeycomb formed body after firing. The porosity is measured by the mercury intrusion method in accordance with JIS R1655: 2003 using a mercury porosimeter.

The thickness of the partition walls is preferably 150 µm or more, more preferably 170 µm or more, and even more preferably 190 µm or more, from the viewpoint of increasing the strength of the pillar-shaped honeycomb formed body after firing and the collection efficiency in the case of filter application. In addition, the thickness of the partition walls is preferably 260 µm or less, more preferably 240 µm or less, and even more preferably 220 µm or less, from the viewpoint of suppressing pressure loss.

When the pillar-shaped honeycomb formed body (100, 200) is used as a catalyst carrier, the surface of the partition walls (112, 212) can be coated with a catalyst according to the purpose. As examples of catalyst, without limitation, oxidation catalyst (DOC) for raising the exhaust gas temperature by oxidative combustion of hydrocarbons (HC) and carbon monoxide (CO), PM combustion catalyst that assists the combustion of PM such as soot, SCR catalyst and NSR catalyst for removing nitrogen oxides (NOx), and three-way catalyst that can simultaneously remove hydrocarbons (HC), carbon monoxide (CO) and nitrogen oxides (NOx) can be mentioned. The catalyst may appropriately comprise, for example, noble metals (Pt, Pd, Rh, etc.), alkali metals (Li, Na, K, Cs, etc.), alkaline earth metals (Mg, Ca, Ba, Sr, etc.), rare earths (Ce, Sm, Gd, Nd, Y, La, Pr, etc.), transition metals (Mn, Fe, Co, Ni, Cu, Zn, Sc, Ti, Zr, V, Cr, etc.) and the like.

<2. Method for Manufacturing Pillar-Shaped Honeycomb Formed Body>

The pillar-shaped honeycomb formed body can be manufactured by a known manufacturing method and will be described below by way of example. First, a raw material composition containing a ceramic raw material, a dispersion medium, a pore-forming agent and a binder is kneaded to form a green body. Then, by extruding the green body and drying it, a pillar-shaped honeycomb formed body before firing can be manufactured. Additives such as a dispersant can be added to the raw material composition as needed. In extrusion molding, a die having a desired overall shape, cell shape, partition wall thickness, cell density and the like can be used.

In the drying step, conventionally known drying methods such as hot air drying, microwave drying, dielectric drying, reduced pressure drying, vacuum drying, and freeze drying can be used. Among these, a drying method that combines hot air drying with microwave drying or dielectric drying is preferable in that the entire formed body can be dried quickly and uniformly. The sealing portion can be formed by forming the sealing portion at predetermined positions on both end surfaces of the dried honeycomb formed body and then drying the sealing portion.

The ceramic raw material is a raw material for a portion of a metal oxide, a metal, or the like that remains after firing and constitutes the skeleton of the pillar-shaped honeycomb formed body (pillar-shaped honeycomb structure) after firing as ceramics. The ceramic raw material can be provided, for example, in the form of powder. Examples of the ceramic raw material include raw materials for obtaining ceramics such as cordierite, mullite, zircon, aluminum titanate, silicon carbide, silicon nitride, zirconia, spinel, indialite, sapphirine, corundum, and titania. Specifically, examples include, but are not limited to, silica, talc, alumina, kaolin, serpentine, pyroferrite, bluesite, boehmite, mullite, magnesite, and aluminum hydroxide. As the ceramic raw material, one type may be used alone, or two or more types may be used in combination.

In the case of filter applications such as DPF and GPF, cordierite can be preferably used as the ceramics. In this case, a cordierite-forming raw material can be used as the ceramic raw material. A cordierite-forming raw material is a raw material that becomes cordierite by firing. It is desirable that the cordierite-forming raw material has a chemical composition of alumina ($Al_2O_3$) (including the amount of aluminum hydroxide converted to alumina): 30 to 45% by mass, magnesia (MgO): 11 to 17% by mass, and silica ($SiO_2$): 42 to 57% by mass.

Examples of the dispersion medium include water or a mixed solvent of water and an organic solvent such as alcohol, and water can be particularly preferably used.

The pore-forming agent is not particularly limited as long as it becomes pores after firing, and examples thereof include wheat flour, starch, foamed resin, water-absorbing resin, silica gel, carbon (for example, graphite), ceramic balloon, polyethylene, polystyrene, polypropylene, nylon, polyester, acrylic and phenol, and the like. As the pore-forming agent, one type may be used alone, or two or more types may be used in combination. The content of the pore-forming agent is preferably 0.5 parts by mass or more, more preferably 2 parts by mass or more, and even more preferably 3 parts by mass or more with respect to 100 parts by mass of the ceramic raw material, from the viewpoint of increasing the porosity of the honeycomb formed body after firing. The content of the pore-forming agent is preferably 10 parts by mass or less, more preferably 7 parts by mass or less, and even more preferably 4 parts by mass or less with respect to 100 parts by mass of the ceramic raw material, from the viewpoint of ensuring the strength of the honeycomb formed body after firing.

Examples of the binder include organic binders such as methyl cellulose, hydroxypropyl methyl cellulose, hydroxyethyl cellulose, carboxymethyl cellulose, polyvinyl alcohol, and the like. In particular, it is preferable to use methyl cellulose and hydroxypropyl methyl cellulose in combination. Further, the content of the binder is preferably 4 parts by mass or more, more preferably 5 parts by mass or more, and even more preferably 6 parts by mass or more with respect to 100 parts by mass of the ceramic raw material, from the viewpoint of increasing the strength of the honeycomb formed body before firing. The content of the binder is preferably 9 parts by mass or less, more preferably 8 parts by mass or less, and even more preferably 7 parts by mass or less with respect to 100 parts by mass of the ceramic raw material, from the viewpoint of suppressing the occurrence of cracking due to abnormal heat generation in the firing process. As for the binder, one type may be used alone, or two or more types may be used in combination.

As the dispersant, ethylene glycol, dextrin, fatty acid soap, polyether polyol and the like can be used. As the dispersant, one type may be used alone, or two or more types may be used in combination. The content of the dispersant is preferably 0 to 2 parts by mass with respect to 100 parts by mass of the ceramic raw material.

The pillar-shaped honeycomb formed body may have both ends of all cells opened, as in the pillar-shaped honeycomb formed body (100). Further, the pillar-shaped honeycomb formed body may have a cell structure in which one end of each of the cells is sealed alternately, as in the pillar-shaped honeycomb formed body (200). The method for sealing the end surface of the pillar-shaped honeycomb formed body is not particularly limited, and a known method can be adopted.

The material of the sealing portion is not particularly limited, but ceramics is preferable from the viewpoint of strength and heat resistance. The ceramics is preferably ceramics comprising at least one selected from the group consisting of cordierite, mullite, zircon, aluminum titanate, silicon carbide, silicon nitride, zirconia, spinel, indialite, sapphirine, corundum, and titania. The sealing portion is preferably formed of a material comprising 50% by mass or more of these ceramics in total, and more preferably formed of a material comprising 80% by mass or more of these ceramics in total. It is even more preferable that the sealing portion have the same material composition as the main body portion of the honeycomb formed body because the expansion coefficient at the time of firing can be the same and the durability can be improved.

The method of forming the sealing portion will be exemplified. A sealing slurry is stored in a storage container. Next, a mask having openings at positions corresponding to the cells on which the sealing portions are to be formed is attached to one of the end surfaces. The end surface to which the mask has been attached is immersed in the storage container, and the openings are filled with a sealing slurry so that sealing portions are formed. The sealing portions can be formed on the other end surface in the same manner.

A pillar-shaped honeycomb formed body (pillar-shaped honeycomb structure) after firing can be manufactured by performing degreasing and firing on the pillar-shaped honeycomb formed body before firing. As the conditions of the degreasing process and the firing process, known conditions may be adopted according to the material composition of the honeycomb formed body. Although no particular explanation is required, specific examples of the conditions are given below.

The degreasing process is herein described. The combustion temperature of the binder is about 200° C., and the combustion temperature of the pore-forming agent is about 300 to 1000° C. Therefore, the degreasing step may be carried out by heating the honeycomb formed body in the range of about 200 to 1000° C. The heating time is not particularly limited but is usually about 10 to 100 hours. The honeycomb formed body after the degreasing step is called a calcined body.

The firing process depends on the material composition of the honeycomb formed body, but can be performed, for example, by heating the calcined body to 1350 to 1600° C. and maintaining the temperature for 3 to 10 hours.

<3. Method for Inspecting a Pillar-Shaped Honeycomb Formed Body Before Firing or after Firing>

According to one embodiment of the invention, there is provided a method for inspecting a pillar-shaped honeycomb formed body before firing, the pillar-shaped honeycomb formed body having a pillar-shaped honeycomb structure portion comprising an outer peripheral side wall and partition walls disposed on an inner peripheral side of the outer peripheral side wall, the partition walls partitioning a plurality of cells forming flow paths from a first end surface to a second end surface, the method comprising:

a step a1 of capturing at least one of the first end surface and the second end surface of the pillar-shaped honeycomb formed body before firing with a camera to generate an image of the at least one of the first end surface and the second end surface;

a step b1 of measuring a size of an opening of the cells in the image generated by step a1; and a step c1 of identifying abnormal cells with the opening having a size deviating from a predetermined allowable range from the cells based on a measurement result of step b1 and measuring a number of the abnormal cells.

According to another embodiment of the invention, there is provided a method for inspecting a pillar-shaped honeycomb formed body after firing, the pillar-shaped honeycomb formed body having a pillar-shaped honeycomb structure portion comprising an outer peripheral side wall and partition walls disposed on an inner peripheral side of the outer peripheral side wall, the partition walls partitioning a plurality of cells forming flow paths from a first end surface to a second end surface, the method comprising:

a step a2 of capturing at least one of the first end surface and the second end surface of the pillar-shaped honeycomb formed body after firing with a camera to generate an image of the at least one of the first end surface and the second end surface;

a step b2 of measuring a size of an opening of the cells in the image generated by step a2; and a step c2 of identifying abnormal cells with the opening having a size deviating from a predetermined allowable range from the cells based on a measurement result of step b2 and measuring a number of the abnormal cells.

As mentioned above, the number of cells having the opening with an abnormal size shows a significant correlation with the strength of the pillar-shaped honeycomb formed body after firing. Therefore, the strength of the pillar-shaped honeycomb formed body after firing can be estimated based on the number of cells having the opening with an abnormal size.

Therefore, in one embodiment, the method for inspection according to the present invention may further comprise a step d1 of estimating a strength of the pillar-shaped honeycomb formed body after the pillar-shaped honeycomb formed body before firing is fired under predetermined conditions based on the number of the abnormal cells measured in step c1, using a correlation between the number of abnormal cells and strength of a plurality of other pillar-shaped honeycomb formed bodies after firing under the predetermined conditions, the correlation being obtained in advance for the other pillar-shaped honeycomb formed bodies having the same dimensions and the same composition as the pillar-shaped honeycomb formed body before firing. Similarly, in another embodiment, the method for inspection according to the present invention may further comprise a step d2 of estimating a strength of the pillar-shaped honeycomb formed body after firing based on the number of the abnormal cells measured in step c2, using a correlation between the number of abnormal cells and strength of a plurality of other pillar-shaped honeycomb formed bodies, the correlation being obtained in advance for the other pillar-shaped honeycomb formed bodies having the same dimensions and the same composition, and having been prepared under the same firing conditions as the pillar-shaped honeycomb formed body after firing.

(Step a1 or Step a2)

In step a1 or step a2, at least one of the first end surface and the second end surface of the pillar-shaped honeycomb formed body before firing or after firing is captured with a camera, and an image of the at least one of the first end surface and the second end surface is generated. In order to improve the inspection accuracy, it is preferable to generate images of both the first end surface and the second end surface. In particular, in the case of a pillar-shaped honeycomb formed body having sealing portions, there are cells for which the size of opening cannot be measured if only one of the end surfaces is imaged, so it is preferable to generate images of both end surfaces and use them as the object for inspection.

When capturing the first end surface or the second surface with a camera, it is desirable to image the entire first end surface or the entire second end surface. This is to inspect substantially all the cells visible from the first end surface or the second end surface. However, partial cells may be excluded from the object for inspection or may be excluded from the object for imaging. The partial cell refers to a cell located at the outermost peripheral portion and at least partially formed by the outer peripheral side wall. Since a part of the outline of the partial cell is formed by the outer peripheral side wall, the shape of the partial cell is different from that of the cells other than the partial cell (hereinafter, also referred to as "normal cell"), and the area is smaller than that of the normal cell. Further, the number of partial cells is much smaller than that of normal cells. Therefore, the influence of the abnormality of the partial cells on the strength of the pillar-shaped honeycomb formed body after firing is small. Further, since the partial cells are smaller than the normal cells, if their abnormality is to be measured separately from the normal cells, it is necessary to separately set other judgement criteria for the abnormal cells, which complicates the inspection.

On the other hand, the number of normal cells is overwhelmingly large, and their abnormality has a great influence on the strength of the pillar-shaped honeycomb formed body after firing. For this reason, it is preferable to inspect 90% or more, preferably 95% or more, more preferably all of the normal cells.

Capturing with a camera is preferably performed from a direction perpendicular to the first end surface or the second end surface, for the purpose of improving inspection accuracy. The camera may be an area camera or a line camera, but the area camera is preferable because the imaging tact is fast, the illumination width is wide, and the equipment size can be reduced. From the viewpoint of improving inspection accuracy, it is preferable to use a camera having high pixel resolution. Specifically, considering the ordinary opening area of a cell, the camera preferably has a pixel resolution of 40 µm/pixel or less, preferably 25 µm/pixel or less, in both the vertical direction and the horizontal direction, and can be, for example, 1 to 40 µm/pixel, in both the vertical direction and the horizontal direction.

(Step b1 or Step b2)

In step b1 or step b2, the size of the opening of the cells is measured in the image generated by step a1 or step a2. The size of the opening may be measured by the inspector based on the image, but since the number of cells to be inspected is large, it is preferable to automatically measure the size using an image analyzer. An example of the measurement procedure by the image analyzer will be described later. There are various parameters representing the size of the opening of each cell, and there is no particular limitation, but examples thereof include the opening area of each cell and the diameter of the maximum circle that can fit within the opening of each cell. Among these, the diameter of the maximum circle that can fit within the opening of each cell is preferable because it has a high correlation with strength.

(Step c1 or Step c2)

In step c1 or step c2, based on the measurement result of step b1 or step b2, abnormal cells with the opening having a size deviating from a predetermined allowable range are identified from the cells, and the number of abnormal cells is measured. The measuring of the abnormal cells may also be conducted by the inspector, but from the viewpoint of shortening the time, it is preferable to automatically measure the abnormal cells using an image analyzer. An example of the measuring procedure by the image analyzer will be described later.

In the case where the method for inspection according to the present embodiment is intended to be performed instead of a strength inspection, since the height of the correlation changes depending on how the allowable range is set, it is desirable to set the allowable range under conditions where a high correlation between the number of abnormal cells and the strength of the pillar-shaped honeycomb structure after firing is acknowledged. Specifically, in the case where a pillar-shaped honeycomb formed body before firing is to be inspected, when a correlation between the number of abnormal cells and the strength of a plurality of other pillar-shaped honeycomb formed bodies after firing under predetermined conditions is obtained in advance for the other pillar-shaped honeycomb formed bodies having the same dimensions and the same composition as the pillar-shaped honeycomb formed body before firing, a coefficient of determination ($R^2$) in a linear regression equation should be preferably set to 0.6 or more, typically 0.6 to 0.8, and more typically 0.6 to 0.7. In addition, in the case where a pillar-shaped honeycomb formed body after firing is to be inspected, when a correlation between the number of abnormal cells and the strength of a plurality of other pillar-shaped honeycomb formed bodies is obtained in advance for the other pillar-shaped honeycomb formed bodies having the same dimensions and the same composition, and having been prepared under the same firing conditions as the pillar-shaped honeycomb formed body after firing, a coefficient of determination ($R^2$) in a linear regression equation should be preferably set to 0.6 or more, typically 0.6 to 0.8, and more typically 0.6 to 0.7.

As a specific example of the allowable range, when the diameter of the maximum circle that can be fit within the opening is regarded as the size of the opening, a cell in which the ratio of the size of the opening to the designed size of cell opening is 93% or more can be regarded as a normal cell.

(Step d1 or Step d2)

In step d1, a strength of the pillar-shaped honeycomb formed body after the pillar-shaped honeycomb formed body before firing is fired under predetermined conditions is estimated based on, the number of the abnormal cells measured in step c1, using a correlation between the number of abnormal cells and strength of a plurality of other pillar-shaped honeycomb formed bodies after firing under the predetermined conditions, the correlation being obtained in advance for the other pillar-shaped honeycomb formed bodies having the same dimensions and the same composition as the pillar-shaped honeycomb formed body before firing.

In step d2, a strength of the pillar-shaped honeycomb formed body after firing is estimated based on the number of the abnormal cells measured in step c2, using a correlation between the number of abnormal cells and strength of a plurality of other pillar-shaped honeycomb formed bodies, the correlation being obtained in advance for the other pillar-shaped honeycomb formed bodies having the same dimensions and the same composition, and having been prepared under the same firing conditions as the pillar-shaped honeycomb formed body after firing.

It is preferable that the correlation used in the step d1 or the step d2 have a coefficient of determination ($R^2$) of 0.6 or more in a linear regression equation, from the viewpoint of improving the strength estimation accuracy. A higher coefficient of determination ($R^2$) is preferable, but 0.6 to 0.8, more typically 0.6 to 0.7 can be adopted.

There are various parameters representing the strength of the pillar-shaped honeycomb formed body, and the parameters are not particularly limited. The examples thereof include isostatic crush strength and compressive strength. Among these, the isostatic crush strength has a high correlation with the size of the cell opening, resulting in a high estimation accuracy.

The coefficient of determination ($R^2$) is a parameter representing the extent of the accuracy of a regression equation and takes a value from 0 to 1. When the regression equation is obtained from the measured data for the strength of the pillar-shaped honeycomb formed body and the number of abnormal cells, it can be said that the closer the coefficient of determination is to 1, the higher the correlation between the two is, and the strength can be estimated with high accuracy from the number of abnormal cells.

The coefficient of determination ($R_2$) is calculated by the following equation.

$$R^2 = \frac{\sum_{i=1}^{n}(\hat{y}_i - \overline{y})^2}{\sum_{i=1}^{n}(y_i - \overline{y})^2} = 1 - \frac{\sum_{i=1}^{n}(y_i - \hat{y}_i)^2}{\sum_{i=1}^{n}(y_i - \overline{y})^2} \quad \text{[Equation 1]}$$

($x_i, y_i$) is the measured data
($x_i, \hat{y}_i$) is the data estimated from the regression equation
($\overline{x}, \overline{y}$) is the average value obtained from the entire data
n is the number of data (Image Analyzer)

Figure 7:
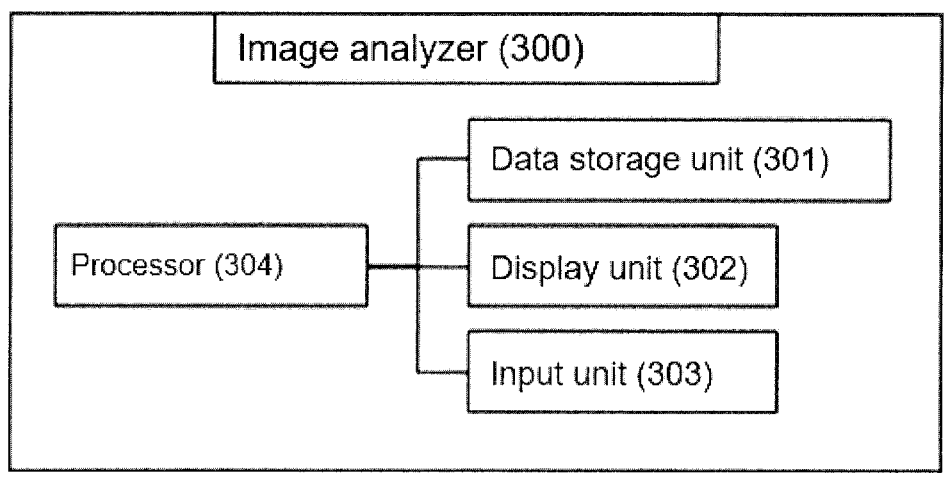
FIG. 7 shows an example of a functional block diagram of an image analyzer.

FIG. 7 shows an example of a functional block diagram of an image analyzer (300). The image analyzer (300) includes a data storage unit (301), a display unit (302), an input unit (303), and a processor (304).

The data storage unit (301) can be composed of, for example, a semiconductor memory, and can store the image data of the at least one of the first end surface and the second end surface of the pillar-shaped honeycomb formed body generated by a camera. In addition, it is capable of storing the allowable range regarding the size of the opening of the cell for determining the abnormal cells.

The input unit (303) can be composed of, for example, a keyboard, a touch panel, a numeric keypad, a mouse, or the like, and the inspector can give an instruction to start image analysis on a desired image showing the first end surface or the second end surface of the pillar-shaped honeycomb formed body via the input unit (303).

The display unit (302) can be composed of, for example, a display device such as a liquid crystal display or an organic EL display and can display image data stored in the data storage unit (301). In addition, the result of image analysis can be displayed.

The processor (304) can be composed of, for example, a CPU (Central Processing Unit), an MPU (Micro Processing Unit), or the like. When the processor (304) receives a command to start image analysis from the input unit (303), the processor (304) executes image analysis based on the image data stored in the data storage unit (301), identifies the abnormal cells, and measures the abnormal cells.

The image analysis, in one embodiment, comprises a step of image processing the image of the at least one of the first end surface and the second end surface of the pillar-shaped honeycomb formed body captured by the camera, a step of measuring the size of the opening of the cells which the at least one of the first end surface and the second end surface have based on the image of the at least one of the first end surface and the second end surface obtained by the image processing step, and a step of identifying abnormal cells with the opening having a size deviating from a predetermined allowable range from the cells based on the measurement result of the step of measuring the size of the opening, and measuring the number of the abnormal cells.

In order to easily measure the size of the opening, in the step of image processing the processor (304) preferably performs an image processing comprising:

a binarization process in which the inner peripheral side of the outer peripheral side wall is divided into: a) a cell opening region, and b) a partition wall region and an outer peripheral side wall region, based on a predetermined brightness threshold value, in the image of the at least one of the first end surface and the second end surface of the pillar-shaped honeycomb formed body, after the binarization process, a step of identifying the partition wall region by distinguishing the outer peripheral side wall region as the region outside a region which is offset inward by a predetermined threshold value from the contour line forming the outermost surface of the outer peripheral side wall, a smoothing process that performs averaging filtering on the identified partition wall region, a skeletonization process to extract the core line of the partition wall region from the partition wall region after the smoothing process, an expansion process of the core line extracted by the skeletonization process.

The threshold value in the binarization process can be set from the viewpoint of distinguishing and recognizing the opening region from the partition wall region and the outer peripheral side wall region. For example, when the background is black and the degree of black and white of the pixels is 0 to 255, the threshold value can be set in the range of 30 to 100, preferably 50 to 80. By performing the binarization process, the partition wall portion and the opening portion can be clearly separated, and there is an advantage that the image analysis is facilitated.

In the smoothing process, for example, an averaging filtering can be adopted in which the average value of the pixel values of a region specified by 9 (3 vertical×3 horizontal) or 25 (5 vertical×5 horizontal) pixels is used to update the value of the pixel in the center of the region. By performing the smoothing process, noise is removed, so that the partition wall portion can be recognized more clearly when performing the image processing described later, and there is an advantage that the inspection accuracy is improved.

In the skeletonization process, for example, circles having a diameter corresponding to the thickness of the partition wall are arranged in series in the partition wall region so as to be adjacent to each other along the extending direction of the partition wall, and the central pixels of the circles are connected to each other so that the core line can be extracted. By performing the skeletonization process, the center line of the partition wall can be recognized, so that the linearity of the partition wall can be clearly recognized, and there is an advantage that the inspection accuracy is improved.

The expansion process is preferably performed until the thickness of the partition wall reaches a predetermined number of pixels in the range of, for example, 20 µm to 200 µm. However, since the opening size of the cells changes significantly when the expansion process is excessively performed, it is more preferable to expand the core line to the thickness of the partition wall corresponding to the designed value of the pillar-shaped honeycomb formed body to be inspected. It is considered that by performing the expansion process, the inspection accuracy will be improved because the linearity of the partition wall can be emphasized and an inspection close to the actual condition becomes possible.

After the image processing, the processor (304) regards the expanded core line as the partition wall region to modify the opening region of the cells, and determines the size of the opening of the cells based on the modified opening region of the cells. As described above, it is preferable to exclude the partial cells from the cells for measuring the size of the opening.

(Quality Inspection)

According to one embodiment of the present invention, there is provided a method for performing quality inspection of a pillar-shaped honeycomb formed body before firing or after firing based on the number of abnormal cells measured by the above-described method for inspection. For example, based on the correlation between the number of abnormal cells and the strength of the pillar-shaped honeycomb formed body after firing, a linear regression equation or a non-linear regression equation expressing the correlation between the two is derived, and the number of abnormal cells that is allowed ("allowable number of abnormal cells") is calculated in advance based on the strength required for the pillar-shaped honeycomb formed body after firing. Next, in the quality inspection, the number of abnormal cells measured by the above-described method for inspection is compared with the allowable number of abnormal cells. For example, if the measured number of abnormal cells exceeds the allowable number of abnormal cells, the inspected pillar-shaped honeycomb formed body is judged as a defective product, and if the measured number of abnormal cells is less than or equal to the allowable number of abnormal cells, it can be judged as an acceptable product.

According to another embodiment of the present invention, there is provided a method of performing quality inspection of a pillar-shaped honeycomb formed body before or after firing based on the strength estimated by the above-described method for inspection. For example, in the quality inspection, if the estimated strength is lower than the strength required for the pillar-shaped honeycomb formed body after firing, the inspected pillar-shaped honeycomb formed body is judged as a defective product, and the estimated strength is equal to or higher than the required strength, it can be judged as an acceptable product.

The pass/fail judgment by the quality inspection may be performed by the inspector based on the number of abnormal cells or the estimated strength, but it can also be performed by the image analyzer (300). In this case, the data storage unit (301) stores information related to the allowable number of abnormal cells and/or the strength required for the pillar-shaped honeycomb formed body after firing. Based on the information, the processor (304) can compare the measured number of abnormal cells with the allowable number of abnormal cells to judge pass/fail, or can compare the estimated strength with the strength required for the pillar-shaped honeycomb formed body after firing to judge pass/fail. It is also possible to configure the image analyzer (300) so that the result of the pass/fail judgement is displayed on the display unit (302).

EXAMPLES

Test Example 1

(1. Preparation of Pillar-Shaped Honeycomb Formed Body)

To 100 parts by mass of cordierite-forming raw material, 6 parts by mass of pore-forming agent, 35 parts by mass of dispersion medium, 6 parts by mass of organic binder, and 0.5 parts by mass of the dispersant were added, mixed, and kneaded, respectively, so that a green body was prepared. Alumina, aluminum hydroxide, kaolin, talc, and silica were used as the cordierite-forming raw material. Water was used as the dispersion medium, coke having an average particle diameter of 1 to 10 μm was used as the pore-forming agent, hydroxypropylmethyl cellulose was used as the organic binder, and ethylene glycol was used as the dispersant.

The green body was put into an extrusion molding machine and extruded to obtain a cylindrical honeycomb formed body. After the obtained honeycomb formed body was dielectrically dried and hot-air dried, both end surfaces were cut to have predetermined dimensions to obtain as many dried cylindrical honeycomb formed bodies as necessary for the following tests.

The specifications of the pillar-shaped honeycomb formed body were as follows.

Overall shape: cylindrical with a diameter of 142 mm×a height of 98 mm

Cell shape in cross-section perpendicular to the flow path direction of normal cells: square Designed dimensions of the openings in the cross-section perpendicular to the flow path direction of normal cells: 1.032 mm×1.032 mm (the designed diameter of the maximum circle that can fit within the opening of a normal cell is 1.032 mm)

Cell density (number of cells per unit cross-sectional area): 93 cells/cm$^2$

Designed thickness of partition walls: 70 μm (2. Measurement of Size of Opening of Cells)

For each of the obtained pillar-shaped honeycomb formed bodies (Sample No. 1-1 to 1-36), the size of an opening of each of the cells was measured according to the following procedure. One end surface of each pillar-shaped honeycomb formed body was captured with a camera (pixel resolution 0.01174 mm/pixel in the vertical direction, pixel resolution 0.01174 mm/pixel in the horizontal direction) from the direction perpendicular to the end surface, and an image of the end surface was generated. The generated image was subject to image analysis using an image analyzer (HALCON available from MVTec), and the size of opening of all the cells except partial cells were measured. The results are shown in Table 1.

In the image analysis, the following image processing was performed by the image analyzer.

In the image of the end surface, a binarization process for dividing the inner peripheral side of the outer peripheral side wall into two, a cell opening region and a partition wall region, based on a predetermined brightness threshold value (the threshold value was set to 50. The background was black, and the degree of black and white of the pixels was 0 to 255)

A smoothing processing for performing averaging filtering that updates the partition wall region after the binarization processing to the average value of the pixel values of area specified by 9 pixels (3 vertical×3 horizontal)

A skeletonization processing to extract the core lines of the partition wall region from the partition wall region after the smoothing process An expansion processing to expand the core lines extracted by the skeletonization process to the designed thickness of the partition wall Then, based on the image of the end surface after the image processing, the size of the opening of all the cells except the partial cells of the end surface was measured by the image analyzer. As a parameter of the size of the opening, the diameter of the maximum circle that can fit within the opening of each cell was adopted.

(3. Firing of Pillar-Shaped Honeycomb Formed Body)

Then, each pillar-shaped honeycomb formed body was degreased under the condition of about 200 to 1000° C. in an air atmosphere, then heated to 1350 to 1600° C. and fired under the firing condition of about 3 to 10 hours.

(4. Measurement of Isostatic Crush Strength)

The isostatic crush strength (iso-crush value) of each pillar-shaped honeycomb formed body (sample numbers No. 1-1 to 1-36) after firing was measured based on the automobile standard (JASO M505-87) issued by the Society of Automobile Engineers of Japan, Inc. The results are shown in Table 1. How to read the table is explained below. The size of the opening of cells (cell opening dimension) was specified up to half the size of the pixel. The sample of No. 1-1 had an iso-crush value of 2.12 MPa. In the No. 1-1 sample, it is shown that the number of cells having a maximum circle diameter of 38.0 pixel (0.892 mm) or less is one, and the number of cells having an opening dimension of 38.5 pixel (0.904 mm) or less was 4. The same applies to other opening dimensions. In the table, "R-squared value" is the coefficient of determination ($R^2$) between the number of abnormal cells and the isostatic crush strength assuming that cells with an opening dimension larger than the cell opening dimension of the corresponding column in the table are regarded as normal cells, and the other cells are regarded as abnormal cells. Incidentally, cells with an opening dimension exceeding 43.5 pixel (1.021 mm) were extremely rare in any of the samples and were not listed in the table.

Figure 5:
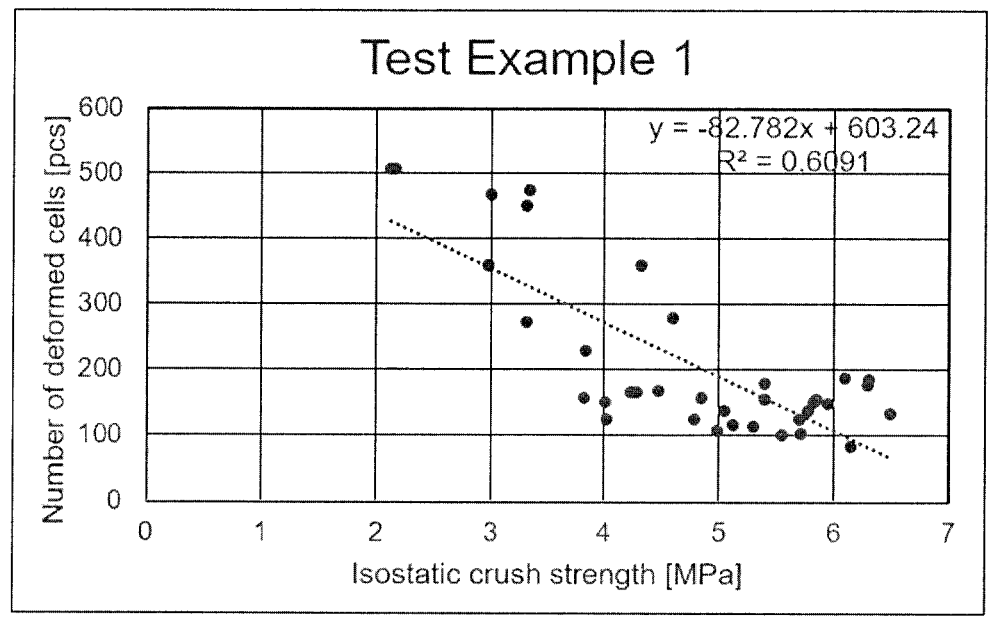
FIG. 5 shows the results of plotting the relationship between the number of deformed cells of the pillar-shaped honeycomb formed body before firing and the isostatic crush strength of the pillar-shaped honeycomb formed body after firing relating to Test Example 1, along with the linear regression equation obtained by the least squares method and coefficient of determination ($R^2$).

FIG. 5 shows the results of plotting the relationship between the number of deformed cells of the pillar-shaped honeycomb formed body before firing and the isostatic crush strength of the pillar-shaped honeycomb formed body after firing relating to Test Example 1, along with the linear regression equation obtained by the least squares method and coefficient of determination ($R^2$), when the allowable range of normal cells was set to 0.963 mm to 1.021 mm.

From the above results, when the allowable range of normal cells was set to 0.963 mm to 1.021 mm, the coefficient of determination ($R^2$) between the number of deformed cells and the isostatic crush strength was 0.6901, so it can be seen that the two had a high correlation. Therefore, it can be seen that the isostatic crush strength of the pillar-shaped honeycomb formed body after firing can be estimated based on the number of abnormal cells of the pillar-shaped honeycomb formed body before firing.

TABLE 1

| No. | iso-crush value [MPa] | Cell opening dimension [pixel] | | | | | | | | | | | |
|---|---|---|---|---|---|---|---|---|---|---|---|---|---|
| | | 38.0 | 38.5 | 39.0 | 39.5 | 40.0 | 40.5 | 41.0 | 41.5 | 42.0 | 42.5 | 43.0 | 43.5 |
| | | Cell opening dimension [mm] | | | | | | | | | | | |
| | | 0.892 | 0.904 | 0.916 | 0.927 | 0.939 | 0.951 | 0.963 | 0.974 | 0.986 | 0.998 | 1.010 | 1.021 |
| | | Number of detected cells | | | | | | | | | | | |
| 1-1 | 2.12 | 1 | 4 | 16 | 47 | 154 | 507 | 1807 | 5184 | 9914 | 12243 | 12783 | 12853 |
| 1-2 | 2.16 | 4 | 6 | 15 | 29 | 81 | 507 | 2647 | 6826 | 10879 | 12448 | 12784 | 12850 |
| 1-3 | 2.97 | 3 | 6 | 10 | 27 | 87 | 360 | 1068 | 3705 | 8739 | 11884 | 12660 | 12764 |
| 1-4 | 3 | 3 | 6 | 18 | 49 | 131 | 468 | 1892 | 5235 | 9527 | 11909 | 12673 | 12813 |
| 1-5 | 3.31 | 3 | 5 | 10 | 40 | 124 | 451 | 1605 | 5013 | 9796 | 12302 | 12794 | 12855 |
| 1-6 | 3.31 | 1 | 3 | 8 | 20 | 79 | 273 | 943 | 3476 | 8683 | 11917 | 12675 | 12760 |
| 1-7 | 3.33 | 3 | 12 | 21 | 56 | 141 | 474 | 1781 | 5104 | 9560 | 11998 | 12710 | 12824 |
| 1-8 | 3.82 | 0 | 1 | 2 | 8 | 28 | 158 | 1076 | 4173 | 9119 | 12050 | 12674 | 12729 |
| 1-9 | 3.83 | 0 | 4 | 5 | 14 | 59 | 228 | 980 | 3549 | 8635 | 11846 | 12612 | 12759 |
| 1-10 | 4.01 | 1 | 1 | 2 | 8 | 27 | 150 | 944 | 3721 | 8619 | 11798 | 12635 | 12728 |
| 1-11 | 4.02 | 0 | 0 | 4 | 8 | 22 | 124 | 785 | 3615 | 8961 | 12035 | 12659 | 12733 |
| 1-12 | 4.23 | 0 | 1 | 2 | 10 | 39 | 167 | 984 | 4055 | 8958 | 11852 | 12642 | 12733 |
| 1-13 | 4.28 | 0 | 1 | 2 | 10 | 39 | 167 | 984 | 4055 | 8958 | 11852 | 12642 | 12733 |
| 1-14 | 4.32 | 3 | 9 | 18 | 31 | 97 | 359 | 1520 | 4832 | 9592 | 12129 | 12741 | 12830 |
| 1-15 | 4.47 | 1 | 1 | 3 | 5 | 25 | 168 | 1089 | 4125 | 9084 | 11956 | 12657 | 12730 |
| 1-16 | 4.6 | 1 | 2 | 5 | 21 | 76 | 278 | 1032 | 3569 | 8809 | 11948 | 12676 | 12763 |
| 1-17 | 4.78 | 1 | 1 | 2 | 4 | 24 | 125 | 977 | 3921 | 8834 | 11916 | 12655 | 12728 |
| 1-18 | 4.85 | 1 | 2 | 2 | 8 | 36 | 157 | 1003 | 3861 | 8880 | 11894 | 12609 | 12723 |
| 1-19 | 4.98 | 0 | 1 | 5 | 13 | 26 | 108 | 730 | 3497 | 8833 | 12049 | 12677 | 12731 |
| 1-20 | 5.04 | 3 | 5 | 7 | 13 | 32 | 138 | 980 | 4139 | 9233 | 12061 | 12678 | 12731 |
| 1-21 | 5.12 | 0 | 0 | 3 | 7 | 24 | 116 | 839 | 3649 | 8989 | 12101 | 12705 | 12729 |
| 1-22 | 5.29 | 0 | 2 | 7 | 11 | 31 | 114 | 768 | 3587 | 8881 | 12089 | 12675 | 12729 |
| 1-23 | 5.39 | 0 | 0 | 2 | 5 | 21 | 156 | 911 | 4125 | 9561 | 12371 | 12764 | 12784 |
| 1-24 | 5.4 | 0 | 0 | 0 | 3 | 30 | 179 | 966 | 3955 | 9414 | 12303 | 12759 | 12778 |
| 1-25 | 5.55 | 0 | 1 | 1 | 4 | 15 | 101 | 783 | 3649 | 8660 | 11817 | 12659 | 12731 |
| 1-26 | 5.7 | 0 | 2 | 6 | 8 | 25 | 125 | 846 | 3775 | 9024 | 12031 | 12681 | 12731 |
| 1-27 | 5.71 | 1 | 2 | 2 | 4 | 16 | 104 | 880 | 3753 | 8674 | 11892 | 12733 | 12733 |
| 1-28 | 5.77 | 1 | 1 | 4 | 8 | 29 | 137 | 984 | 3991 | 9058 | 12017 | 12671 | 12733 |
| 1-29 | 5.82 | 0 | 0 | 0 | 4 | 20 | 151 | 939 | 3955 | 9633 | 12482 | 12763 | 12778 |
| 1-30 | 5.85 | 0 | 0 | 2 | 3 | 30 | 155 | 936 | 4288 | 9574 | 12333 | 12746 | 12777 |
| 1-31 | 5.95 | 0 | 0 | 2 | 4 | 23 | 148 | 951 | 4044 | 9376 | 12315 | 12759 | 12775 |
| 1-32 | 6.09 | 0 | 0 | 3 | 7 | 35 | 187 | 1060 | 4426 | 9799 | 12375 | 12767 | 12783 |
| 1-33 | 6.14 | 1 | 1 | 2 | 9 | 20 | 84 | 781 | 3826 | 9325 | 12172 | 12693 | 12731 |
| 1-34 | 6.3 | 0 | 0 | 0 | 12 | 48 | 176 | 908 | 4033 | 9426 | 12354 | 12763 | 12786 |
| 1-35 | 6.31 | 1 | 1 | 2 | 7 | 31 | 185 | 956 | 4293 | 9768 | 12369 | 12751 | 12779 |
| 1-36 | 6.49 | 0 | 0 | 4 | 8 | 33 | 133 | 857 | 4224 | 9781 | 12395 | 12770 | 12782 |
| | R-squared value | 0.3438 | 0.3967 | 0.4759 | 0.5294 | 0.5427 | 0.6091 | 0.4924 | 0.2362 | 0.0112 | 0.1031 | 0.0281 | 0.1735 |

Test Example 2

(1. Preparation of Pillar-Shaped Honeycomb Formed Body)

Dried pillar-shaped honeycomb formed bodies were prepared as many as necessary for the following tests by the same procedure as in Test Example 1 except that the overall shape was changed to a cylindrical honeycomb formed body having a diameter of 192 mm and a height of 120 mm.

(2. Measurement of Size of Opening of Cells)

For each of the obtained pillar-shaped honeycomb formed bodies (Sample Nos. 2-1 to 2-47), the size of the opening of all the cells except the partial cell was measured by the same procedure as in Test Example 1. The results are shown in Table 2. Incidentally, cells with an opening dimension exceeding 43.5 pixel (1.021 mm) were extremely rare in any of the samples and were not listed in the table.

(3. Firing of Pillar-Shaped Honeycomb Formed Body)

Then, each pillar-shaped honeycomb formed body was degreased under the condition of about 200 to 1000° C. in an air atmosphere, then heated to 1350 to 1600° C. and fired under the firing condition of about 3 to 10 hours.

(4. Measurement of Isostatic Crush Strength)

Figure 6:
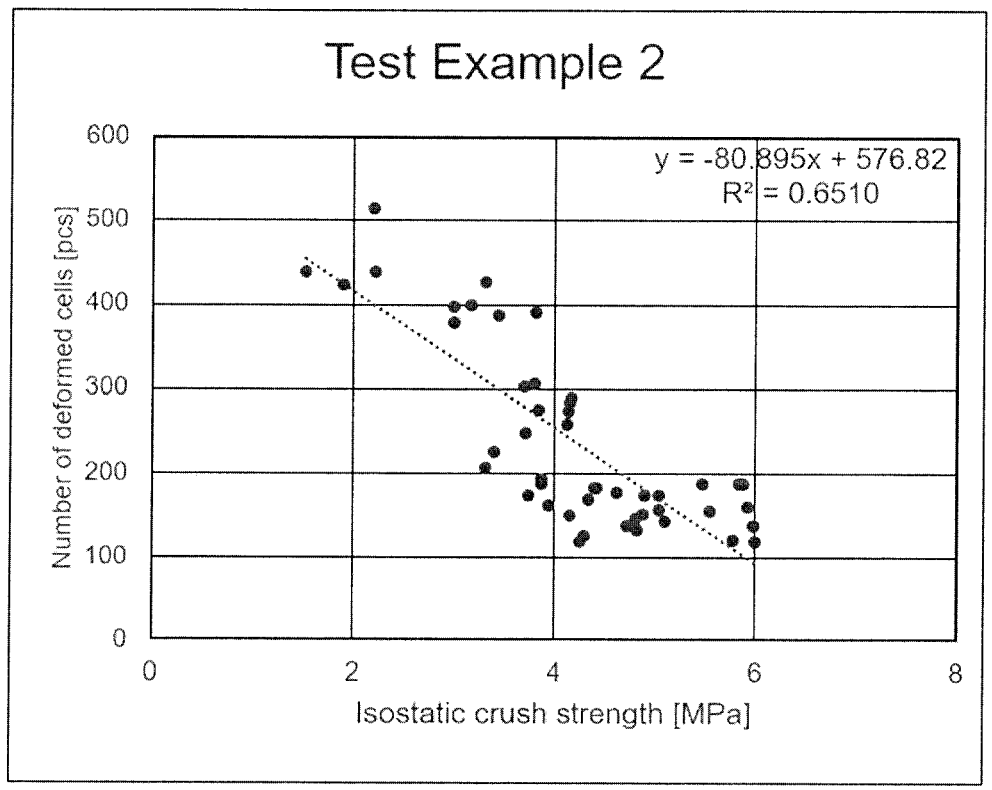
FIG. 6 shows the results of plotting the relationship between the number of deformed cells of the pillar-shaped honeycomb formed body before firing and the isostatic crush strength of the pillar-shaped honeycomb formed body after firing relating to Test Example 2, along with the linear regression equation and coefficient of determination ($R^2$) by the least squares method.

The isostatic crush strength of each pillar-shaped honeycomb formed body (Sample No. 2-1 to 2-47) after firing was measured by the same procedure as in Test Example 1. The results are shown in Table 2. FIG. 6 shows the results of plotting the relationship between the number of deformed cells of the pillar-shaped honeycomb formed body before firing and the isostatic crush strength of the pillar-shaped honeycomb formed body after firing relating to Test Example 2, along with the linear regression equation obtained by the least squares method and coefficient of determination ($R^2$), when the allowable range of normal cells was set to 0.963 mm to 1.021 mm.

From the above results, when the allowable range of normal cells was set to 0.963 mm to 1.021 mm, the coefficient of determination ($R^2$) between the number of deformed cells and the isostatic crush strength was 0.6510, so it can be seen that the two had a high correlation. Therefore, it can be seen that the isostatic crush strength of the pillar-shaped honeycomb formed body after firing can be estimated based on the number of abnormal cells of the pillar-shaped honeycomb formed body before firing.

TABLE 2

| No. | iso-crush value [MPa] | Cell opening dimension [pixel] | | | | | | | | | | |
|---|---|---|---|---|---|---|---|---|---|---|---|---|
| | | 38.0 | 38.5 | 39.0 | 39.5 | 40.0 | 40.5 | 41.0 | 41.5 | 42.0 | 42.5 | 43.0 | 43.5 |
| | | Cell opening dimension [mm] | | | | | | | | | | | |
| | | 0.892 | 0.904 | 0.916 | 0.927 | 0.939 | 0.951 | 0.963 | 0.974 | 0.986 | 0.998 | 1.010 | 1.021 |
| | | Number of detected cells | | | | | | | | | | | |
| 2-1 | 1.52 | 7 | 9 | 31 | 64 | 165 | 439 | 1754 | 6673 | 16921 | 22261 | 22844 | 22872 |
| 2-2 | 1.89 | 5 | 9 | 25 | 56 | 167 | 423 | 1573 | 6560 | 16910 | 22227 | 22832 | 22869 |
| 2-3 | 2.19 | 5 | 10 | 22 | 53 | 172 | 514 | 1919 | 6752 | 16840 | 22294 | 22858 | 22873 |
| 2-4 | 2.21 | 21 | 23 | 45 | 79 | 176 | 438 | 1557 | 6632 | 16973 | 22068 | 22783 | 22874 |
| 2-5 | 2.98 | 0 | 5 | 21 | 45 | 148 | 397 | 1466 | 6063 | 16701 | 22210 | 22848 | 22871 |
| 2-6 | 2.98 | 5 | 7 | 22 | 56 | 145 | 378 | 1589 | 6457 | 16695 | 22202 | 22851 | 22875 |
| 2-7 | 3.16 | 2 | 4 | 15 | 46 | 146 | 399 | 1609 | 6571 | 17116 | 22344 | 22848 | 22869 |
| 2-8 | 3.3 | 23 | 27 | 35 | 47 | 86 | 207 | 1437 | 6528 | 16647 | 22085 | 22821 | 22875 |
| 2-9 | 3.3 | 8 | 11 | 22 | 58 | 160 | 426 | 1597 | 6455 | 16924 | 22358 | 22866 | 22873 |
| 2-10 | 3.39 | 22 | 22 | 29 | 37 | 70 | 225 | 1558 | 7148 | 17100 | 22132 | 22830 | 22880 |
| 2-11 | 3.43 | 0 | 4 | 18 | 57 | 153 | 387 | 1439 | 6433 | 17103 | 22187 | 22820 | 22868 |
| 2-12 | 3.69 | 8 | 9 | 19 | 47 | 126 | 303 | 1102 | 5223 | 15682 | 22168 | 22871 | 22892 |
| 2-13 | 3.71 | 4 | 5 | 12 | 37 | 105 | 248 | 1029 | 5399 | 15625 | 22049 | 22861 | 22891 |
| 2-14 | 3.74 | 12 | 15 | 22 | 31 | 49 | 174 | 1237 | 6436 | 16572 | 22086 | 22825 | 22859 |
| 2-15 | 3.79 | 5 | 5 | 14 | 42 | 124 | 307 | 1258 | 5561 | 15136 | 21756 | 22848 | 22892 |
| 2-16 | 3.8 | 1 | 2 | 15 | 48 | 142 | 390 | 1477 | 5991 | 16625 | 22164 | 22844 | 22868 |
| 2-17 | 3.83 | 13 | 19 | 36 | 68 | 131 | 276 | 1138 | 5308 | 15873 | 21963 | 22858 | 22893 |
| 2-18 | 3.86 | 2 | 2 | 3 | 5 | 26 | 193 | 1683 | 7161 | 16195 | 21597 | 22757 | 22840 |
| 2-19 | 3.87 | 22 | 26 | 31 | 42 | 58 | 187 | 1356 | 6825 | 16404 | 21733 | 22885 | 22885 |
| 2-20 | 3.94 | 7 | 7 | 10 | 14 | 34 | 162 | 1249 | 6330 | 16470 | 21983 | 22813 | 22862 |
| 2-21 | 4.12 | 2 | 4 | 10 | 45 | 109 | 258 | 939 | 5040 | 15522 | 21986 | 22856 | 22890 |
| 2-22 | 4.13 | 26 | 26 | 35 | 45 | 77 | 273 | 1641 | 7089 | 17121 | 22068 | 22814 | 22876 |
| 2-23 | 4.15 | 8 | 9 | 10 | 17 | 34 | 149 | 1182 | 6440 | 16288 | 21770 | 22758 | 22861 |
| 2-24 | 4.15 | 11 | 17 | 28 | 59 | 128 | 284 | 1121 | 5169 | 15488 | 21955 | 22850 | 22892 |
| 2-25 | 4.16 | 3 | 4 | 15 | 42 | 110 | 289 | 1218 | 5365 | 15343 | 21819 | 22832 | 22885 |
| 2-26 | 4.25 | 5 | 6 | 9 | 16 | 27 | 119 | 1114 | 6310 | 16490 | 22031 | 22794 | 22856 |
| 2-27 | 4.3 | 3 | 3 | 6 | 11 | 27 | 125 | 1413 | 6668 | 16451 | 21904 | 22780 | 22840 |
| 2-28 | 4.34 | 2 | 2 | 4 | 4 | 17 | 168 | 1457 | 6732 | 16094 | 21713 | 22770 | 22845 |
| 2-29 | 4.39 | 29 | 34 | 40 | 53 | 82 | 182 | 1277 | 6590 | 16693 | 22048 | 22805 | 22878 |
| 2-30 | 4.43 | 18 | 25 | 30 | 39 | 61 | 183 | 1263 | 6209 | 16341 | 21947 | 22813 | 22871 |
| 2-31 | 4.63 | 29 | 31 | 36 | 48 | 73 | 178 | 1234 | 6634 | 16901 | 22150 | 22824 | 22876 |
| 2-32 | 4.72 | 10 | 13 | 19 | 29 | 46 | 137 | 1191 | 6417 | 16331 | 21948 | 22806 | 22863 |
| 2-33 | 4.82 | 25 | 29 | 31 | 37 | 55 | 147 | 1225 | 6485 | 16621 | 22033 | 22813 | 22876 |
| 2-34 | 4.83 | 19 | 22 | 27 | 35 | 60 | 132 | 1046 | 5715 | 15763 | 21798 | 22784 | 22864 |
| 2-35 | 4.88 | 16 | 19 | 24 | 31 | 59 | 151 | 1253 | 6771 | 17059 | 22108 | 22820 | 22874 |
| 2-36 | 4.9 | 7 | 7 | 8 | 13 | 40 | 174 | 1223 | 6170 | 16321 | 21886 | 22791 | 22854 |
| 2-37 | 5.04 | 11 | 15 | 20 | 31 | 53 | 156 | 1097 | 6111 | 16417 | 22083 | 22823 | 22858 |
| 2-38 | 5.04 | 1 | 1 | 4 | 7 | 23 | 173 | 1538 | 6901 | 16206 | 21707 | 22765 | 22842 |
| 2-39 | 5.1 | 10 | 11 | 12 | 17 | 37 | 143 | 1221 | 6422 | 16796 | 22112 | 22813 | 22866 |
| 2-40 | 5.47 | 2 | 2 | 3 | 8 | 25 | 187 | 1606 | 6889 | 16117 | 21663 | 22782 | 22842 |
| 2-41 | 5.54 | 1 | 1 | 3 | 5 | 20 | 155 | 1412 | 6627 | 16138 | 21744 | 22737 | 22834 |
| 2-42 | 5.77 | 8 | 9 | 10 | 17 | 39 | 121 | 1207 | 6447 | 16564 | 22067 | 22808 | 22861 |
| 2-43 | 5.84 | 3 | 3 | 4 | 7 | 34 | 187 | 1641 | 6832 | 16366 | 21877 | 22772 | 22841 |
| 2-44 | 5.88 | 2 | 2 | 3 | 6 | 23 | 187 | 1512 | 6777 | 16381 | 21874 | 22790 | 22850 |

TABLE 2-continued

| | | Cell opening dimension [pixel] | | | | | | | | | | | |
|---|---|---|---|---|---|---|---|---|---|---|---|---|---|
| | iso-crush | 38.0 | 38.5 | 39.0 | 39.5 | 40.0 | 40.5 | 41.0 | 41.5 | 42.0 | 42.5 | 43.0 | 43.5 |
| | | | | | | | Cell opening dimension [mm] | | | | | | |
| No. | value [MPa] | 0.892 | 0.904 | 0.916 | 0.927 | 0.939 | 0.951 | 0.963 | 0.974 | 0.986 | 0.998 | 1.010 | 1.021 |
| | | | | | | | Number of detected cells | | | | | | |
| 2-45 | 5.92 | 2 | 4 | 7 | 14 | 41 | 160 | 1369 | 6514 | 16338 | 21936 | 22784 | 22841 |
| 2-46 | 5.98 | 1 | 1 | 4 | 8 | 19 | 137 | 1389 | 6705 | 16363 | 21862 | 22771 | 22845 |
| 2-47 | 5.99 | 11 | 11 | 12 | 16 | 35 | 118 | 1033 | 6202 | 16461 | 21983 | 22815 | 22864 |
| | R-squared value | 0.0041 | 0.0175 | 0.2627 | 0.5465 | 0.6488 | 6.6510 | 0.1551 | 0.0039 | 0.0699 | 0.2888 | 0.2814 | 0.2462 |

Incidentally, since there is no substantial difference in the size of cells after firing, it is also possible to estimate the isostatic crush strength of the pillar-shaped honeycomb formed body after firing based on the number of abnormal cells of the pillar-shaped honeycomb formed body after firing.

DESCRIPTION OF REFERENCE NUMERALS 100, 200 Pillar-shaped honeycomb formed body
102, 202 Outer peripheral side wall
104, 204 First end surface
106, 206 Second end surface
108, 208a, 208b cell
112, 212 Partition wall
209 Sealing Portion
300 Image analyzer
301 Data storage unit
302 Display unit
303 Input unit
304 Processor

The invention claimed is:

1. A method for inspecting a pillar-shaped honeycomb formed body before firing,
the pillar-shaped honeycomb formed body having a pillar-shaped honeycomb structure portion comprising an outer peripheral side wall and partition walls disposed on an inner peripheral side of the outer peripheral side wall, the partition walls partitioning a plurality of cells forming flow paths from a first end surface to a second end surface,
the method comprising:
a step a1 of capturing at least one of the first end surface and the second end surface of the pillar-shaped honeycomb formed body before firing with a camera to generate an image of the at least one of the first end surface and the second end surface;
a step b1 of measuring a size of an opening of the cells in the image generated by step a1; and
a step c1 of identifying abnormal cells with the opening having a size deviating from a predetermined allowable range from the cells based on a measurement result of step b1 and measuring a number of the abnormal cells.

2. The method according to claim 1, wherein the size of the opening of each of the cells is based on a diameter of a maximum circle that can fit within the opening of each of the cells.

3. The method according to claim 1, further comprising a step d1 of estimating a strength of the pillar-shaped honeycomb formed body after the pillar-shaped honeycomb formed body before firing is fired under predetermined conditions based on the number of the abnormal cells measured in step c1, using a correlation between the number of abnormal cells and strength of a plurality of other pillar-shaped honeycomb formed bodies after firing under the predetermined conditions, the correlation being obtained in advance for the other pillar-shaped honeycomb formed bodies having the same dimensions and the same composition as the pillar-shaped honeycomb formed body before firing.

4. The method according to claim 3, wherein a correlation having a coefficient of determination ($R^2$) of 0.6 or more is used as the correlation when a linear regression equation is calculated.

5. The method according to claim 3, wherein the strength is an isostatic crush strength.

6. A method for inspecting a pillar-shaped honeycomb formed body after firing,
the pillar-shaped honeycomb formed body having a pillar-shaped honeycomb structure portion comprising an outer peripheral side wall and partition walls disposed on an inner peripheral side of the outer peripheral side wall, the partition walls partitioning a plurality of cells forming flow paths from a first end surface to a second end surface,
the method comprising:
a step a2 of capturing at least one of the first end surface and the second end surface of the pillar-shaped honeycomb formed body after firing with a camera to generate an image of the at least one of the first end surface and the second end surface;
a step b2 of measuring a size of an opening of the cells in the image generated by step a2; and
a step c2 of identifying abnormal cells with the opening having a size deviating from a predetermined allowable range from the cells based on a measurement result of step b2 and measuring a number of the abnormal cells.

7. The method according to claim 6, wherein the size of the opening of each of the cells is based on a diameter of a maximum circle that can fit within the opening of each of the cells.

8. The method according to claim 6, further comprising a step d2 of estimating a strength of the pillar-shaped honeycomb formed body after firing based on the number of the abnormal cells measured in step c2, using a correlation between a number of abnormal cells and strength of a plurality of other pillar-shaped honeycomb formed bodies, the correlation being obtained in advance for the other pillar-shaped honeycomb formed bodies having the same dimensions and the same composition, and having been prepared under the same firing conditions as the pillar-shaped honeycomb formed body after firing.

9. The method according to claim 8, wherein a correlation having a coefficient of determination ($R^2$) of 0.6 or more is used as the correlation when a linear regression equation is calculated.

10. The method according to claim 8, wherein the strength is an isostatic crush strength.

\* \* \* \* \*